Figure 1:
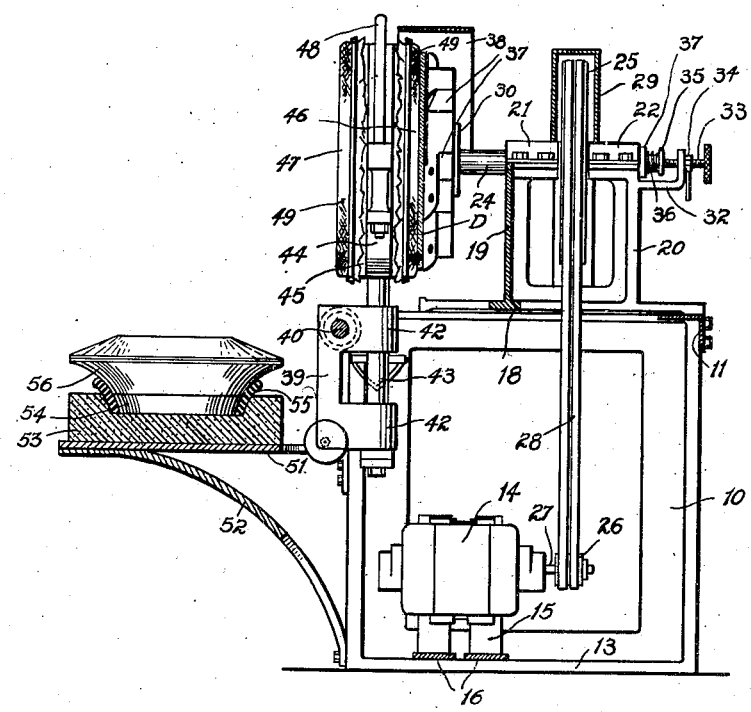

March 11, 1947.   F. M. KINNARD   2,417,255
CLAY SPREADER
Filed Oct. 25, 1945   2 Sheets-Sheet 1

Inventor
Frank M. Kinnard
By Freast and Bishop  Attorneys

March 11, 1947. F. M. KINNARD 2,417,255
CLAY SPREADER
Filed Oct. 25, 1945 2 Sheets-Sheet 2

Inventor
Frank M. Kinnard
By Freear and Bishop
Attorneys

Patented Mar. 11, 1947

2,417,255

UNITED STATES PATENT OFFICE 2,417,255

CLAY SPREADER

Frank M. Kinnard, Sebring, Ohio

Application October 25, 1945, Serial No. 624,435

15 Claims. (Cl. 25—22)

This invention relates to clay working machinery, and more particularly to the type of machines known as spreaders, for spreading out a ball or lump of clay into a flat, smooth disc, preparatory to placing it on a mold where it may be jiggered or otherwise shaped as in usual practice.

Clay spreaders of the general character above referred to were first disclosed in my prior Patent No. 1,430,309, issued September 26, 1922, and the present invention is an improvement upon the type of spreader disclosed in my prior Patent No. 2,335,123 issued November 23, 1943, provided with a double-faced block as shown in my prior Patent No. 1,778,324 issued October 14, 1930, and so constructed that as each flat clay disc is formed on the block by the spreader tool the block may be reversed and the clay disc transferred directly to a mold without requiring the operator to manually remove the clay disc from the block and place it upon the mold.

It is therefore an object of the invention to provide a clay working machine having a rotary spreader tool and a support for a mold, and a double-faced block mounted for swinging and rotary movement between the spreader tool and the mold, whereby a ball or lump of clay placed upon one face of the block may be spread into a smooth, flat disc when the block is swung into operative position relative to the spreader tool, after which the block is swung toward the mold and at the same time rotated so as to reverse the positions of the faces thereof and transfer the flat clay disc onto the mold, while at the same time a lump or ball of clay may be placed upon the other face of the block and the operation repeated.

Another object is to provide a machine of the character referred to in which the block is so constructed that the flat clay disc may be easily transferred from the block to the mold by merely pressing or squeezing the same against the mold.

A further object is the provision of such a machine in which the spreader tool rotates in a vertical plane and the mold is located in a horizontal plane, while the double-faced block is mounted to swing through an approximately 90° arc between the spreader tool and mold and to be rotated so as to alternately present each face to the spreader tool and then to the mold.

A still further object is to provide a block formed of flexible or resilient material, such as rubber, preferably covered with a material such as flannel which will not adhere to the flat clay disc as tenaciously as the plaster mold, so that the flat clay disc may be easily transferred from the block to the mold by a pressing or squeezing action.

Still another object is to provide a block formed of plaster or the like and having opposite faces of rubber or similar flexible or resilient material, the center of the block being apertured to accommodate spring means engaging said rubber faces.

Figure 2:
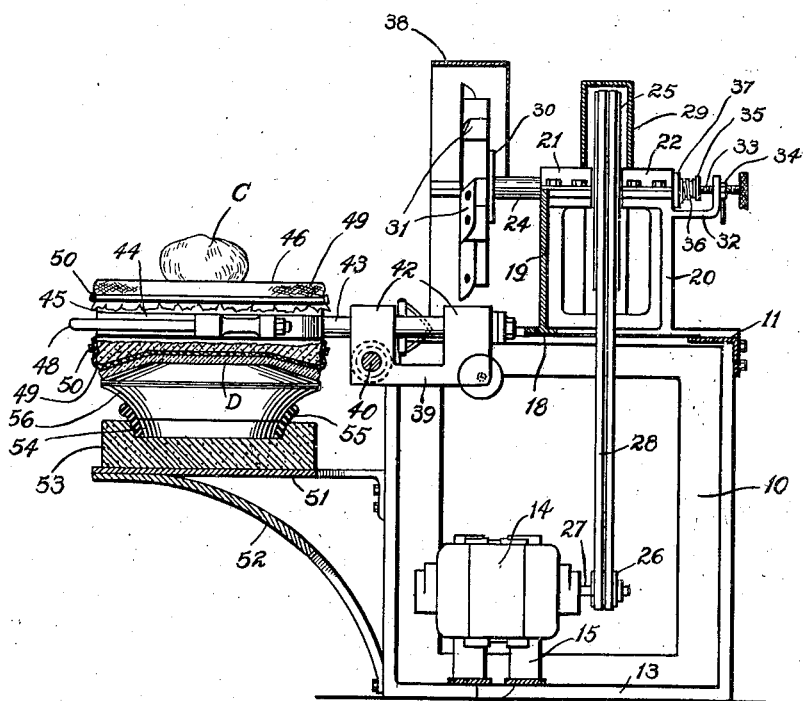
Figure 3:
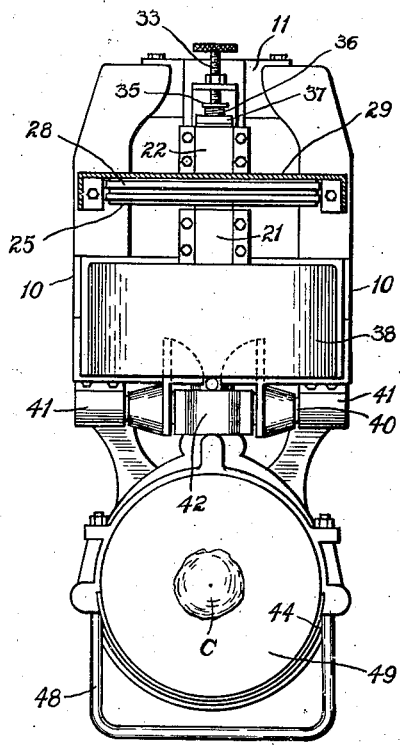
Figure 5:
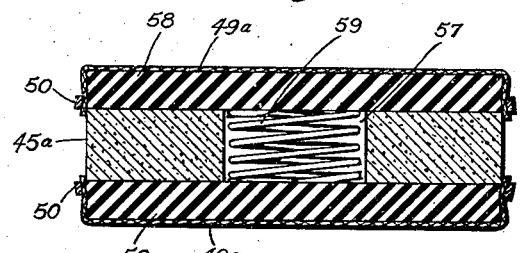
Figure 6:
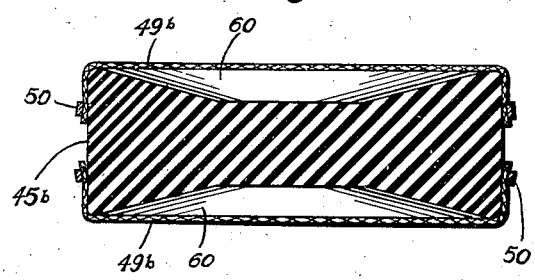
Figure 4:
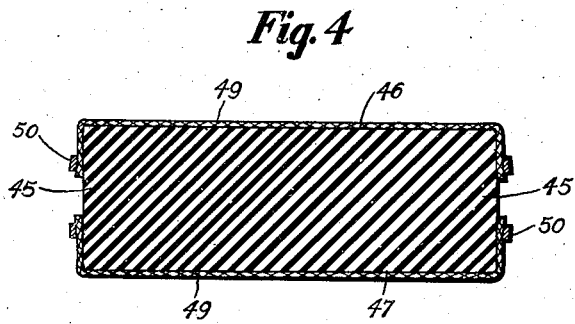

The above objects, together with others, that will be apparent from the drawings and following descriptions, or which may be later referred to, may be attained by constructing the improved clay working machine in the manner illustrated in the accompanying drawings, in which;

Figure 1 is a vertical, longitudinal section through the improved clay working machine, showing hinged, double-faced block with one face in operating position relative to the rotary spreader tool;

Fig. 2 a view similar to Fig. 1, with the block swung down and the positions of the faces reversed, the face of the block bearing the flat clay disc which has just been formed upon the spreader tool being now shown in operative position relative to the mold;

Fig. 3 a top plan view of the machine in the position shown in Fig. 2, parts being broken away for the purpose of illustration;

Fig. 4 a diametrical, section through the double-faced block;

Fig. 5 a similar view of a modified form of block, and;

Fig. 6 a similar view of another modification of the block.

The machine may be mounted upon a base comprising the side frames 10, connected together at their rear upper corners as by the angle iron 11 and at their upper front corners in a manner to be later described.

The lower ends of the frame members 10 are provided with the inturned flanges 13, forming a support for the motor 14, carried upon a bracket 15 mounted upon the transverse bars 16 which are connected to the flanges 13.

A housing may normally enclose the motor 14 to protect it from particles of clay which may drop from the machine during the operation thereof, but for the purpose of illustration this housing is removed in Figs. 1 and 2.

The bed plate 18 is mounted upon the top of the side frames 10 and provided with the spaced uprights 19 and 20 upon the upper ends of which are located the aligned bearings 21 and 22.

Suitable bushings may be located in the bearings 21 and 22, the shaft 24 being journalled therethrough and having its ends extending beyond said bearings. A pulley 25 is fixed upon the shaft 24, between the bearings 21 and 22, this pulley being operatively connected to the pulley 26 upon the motor shaft 27 by means of the belt or belts 28. A housing or guard 29 may enclose the pulley 25 in order to protect the operator of the machine.

A rotary spreader tool is fixed upon the forward end of the shaft 24 and is preferably of the same construction as shown in detail in my prior Patent No. 2,335,123, or may be the type of spreader tool shown in any of my prior patents above referred to.

This spreader tool comprises generally the hub 30 fixed upon the front end of the shaft 24 and provided with a plurality of radial wings or blades 31 formed of wood, metal or other suitable material, constructed and arranged in accordance with the disclosure of my prior patents above referred to.

Any desired number of these blades or wings may be provided upon the tool as shown in said prior patents although I prefer to use at least six blades as shown in said Patent No. 2,335,123 in order to completely eliminate "drop bottoms" in the ware.

In order to provide for adjusting the spreader tool for the desired thickness of clay bat to be produced, an angular bracket 32 may be located at the rear side of the upright 20 and provided with a bore through which is located an adjusting screw 33 for adjusting the shaft 24 longitudinally within the bearings 21 and 22, a jam nut 34 being provided for holding the screw in adjusted position.

The adjusting screw 33 contacts the center of the disc 35 mounted upon the rear end of the shaft 24, a coil spring 36 being located around the shaft between the disc 35 and the cup 37 for normally urging the shaft rearwardly so as to hold the disc 35 in contact with the adjusting screw. This permits longitudinal adjustment of the shaft 24, carrying the spreader tool, while the same is rotating.

In order to protect the operator from injury by the rotating spreader tool, as well as to prevent particles of clay from being thrown centrifugally therefrom around the room in which the machine is located, a substantially semicylindrical guard plate 38 may be located around the spreader tool.

All of the parts of the machine so far described, may be of the same general construction and arrangement as disclosed in detail in my prior Patent No. 2,335,123, above referred to.

The double faced block which forms an important part of the present invention is attached to the front of the machine and arranged to be tilted or swung upon its pivot to vertical position adjacent to the spreader tool as shown in Fig. 1, and to a horizontal position adjacent to the mold as shown in Fig. 2, and also arranged to be rotated so as to present either surface to the spreader tool and to the mold.

For this purpose a frame 39 is pivotally mounted upon the front of the machine, as by the shaft 40 journalled in bearings 41 connected to the upper front corner portions of the side frame members 10, said frame being provided with the spaced bearings 42 within which is journalled the shaft 43 carrying the circular clamp 44 at its free end.

The double faced block, indicated generally at 45 is clamped within the clamp ring 44 and provided with the two working surfaces 46 and 47 located at opposite sides of the block, a handle 48 being provided for operating the block to swing upon its pivot 40 and rotate upon its pivot 43.

The swinging and pivotal mounting of this block may be the same as disclosed in detail in my prior Patent No. 1,778,324 above referred to, and the operation of the block may be as disclosed in said patent although in the present invention this swinging and rotating block is provided for a different purpose.

The block 45 is preferably formed of a flexible or resilient material such as rubber, as best illustrated in Fig. 4, and each flat surface 46 and 47 of the block is preferably covered with a drum head 49, preferably formed of flannel, and held tightly stretched over the same as by the ring or plate 50.

For the purpose of supporting a mold in position in front of the machine in such location that the block 45 will cooperate therewith when moved to the horizontal position, as shown in Fig. 2, a bracket 51 preferably of spring material, is mounted upon the front edges of the side frames 10 and may be reinforced as by the curved spring member 52.

The block 53, of plaster or the like, is fixed upon the spring bracket 51 in proper position and provided with a socket 54, in which may be located in a heavy ring 55, of rubber or other resilient material, forming a cushion seat for a plaster mold 56 such as is commonly used in jiggers for forming dishes, plates and similar articles.

In Fig. 5 is shown a modification of the double faced block. In this form of the invention the block, as indicated at 45a, may be formed of plaster or the like of a thickness considerably less than required in the complete block and provided with the central opening 57. Each working surface of the block may be formed of a slab 58 of suitable resilient or flexible material such as rubber, connected to the opposite flat surface of the plaster block 58.

One or more coil springs 59 may be located within the central opening of the plaster block 54a and engage the rubber slabs 58. Drum heads 49a of flannel or the like may be located over the working surfaces of the block.

Another modification is shown in Fig. 6 in which the rubber block 45b may be concaved or recessed on each side as indicated at 60 to accommodate the mold, the flannel drum heads 49b being located over the same.

In the operation of the improved clay working machine, with the block in horizontal position as viewed in Fig. 2, a ball or lump of clay C is placed upon the central portion of the uppermost working surface 46 of the block 45 and by means of the handle 48 the block is swung upward upon its pivot 40 to a vertical position as shown in Fig. 4, bringing the ball of clay into engagement with the rotating spreader tool which rapidly forms the clay into a flat, smooth clay disc D as shown in said figure.

A mold 56 is placed in the socket of the block 53 and as the block 45 is swung downward upon its pivot 40, it is also rotated a half turn upon its pivot 43 and as it is moved into horizontal position the face carrying the thin disc of clay is upon the under side of the block and a downward pressure or squeezing of the block will cause the clay disc to be pressed upon the top surface of the mold 56, as shown in Fig. 2, the resilient rubber block being deformed by the pressure as shown in said figure to accommodate the shape of the mold.

At the same time another ball or lump of clay is placed upon the top surface of the block and the operation repeated. As the block is then swung up toward vertical position the flannel drum head easily releases from the formed clay disc leaving it adhering to the upper surface of the mold 56.

While the block is in vertical position, the mold with the formed clay disc thereon is removed from the socket in the block 53 and another mold placed in position in said socket to receive the next clay disc which is being formed by the spreader tool during this operation.

From the above it will be obvious that a clay working machine is provided which not only combines all of the best features of such clay working machines in the prior art, but which is an improvement over the same, and which provides for a rapid production of high class dinnerware and the like by forming the flat smooth clay discs with the rotating spreader tool and transferring these discs directly to the mold by a slight pressing or squeezing operation so that it is not necessary for the operator to handle the clay discs.

By providing the double faced block with the swinging and rotating action and mounting the same so as to move alternately from horizontal to vertical position between the block and the rotating spreader tool, it will be seen that the output of the machine will be greatly increased as while the finished flat clay disc is being transferred from one surface of the block to the mold another ball or lump of clay is being placed upon the surface of the block preparatory to being spread into a disc by the spreader tool, and while each clay disc is being spread by the spreader tool the mold with the clay disc thereon is being removed and a fresh mold placed into position to receive the next clay disc.

The resilient or flexible rubber block is a new feature in clay spreaders and batters which has never before been used in the pottery industry. This is an important feature of the invention as it eliminates shock and mold breakage, and by covering the rubber block with flannel or similar material, the flat clay disc may be easily transferred from the block to the mold as the resiliency and flexibility of the block permits the same to conform to the shape of the mold so as to squeeze the clay disc tightly upon the mold while the flannel drum head will quickly release the clay disc from the block as it is moved away from the mold, permitting the disc to stick upon the mold.

I claim:

1. A clay working machine including a rotating spreader tool, a mold and a movable block having opposite working faces arranged to be alternately moved into position adjacent to the spreader tool and adjacent to the mold.

2. A clay working machine including a vertical rotating spreader tool, a horizontal mold and a movable block having opposite working faces arranged to be alternately moved into position adjacent to the spreader tool and adjacent to the mold.

3. A clay working machine including a rotating spreader tool, a resilient mold support, a mold in the support, and a movable block having opposite working faces arranged to be alternately moved into position adjacent to the spreader tool and adjacent to the mold.

4. A clay working machine including a vertical rotating spreader tool, a resilient mold support, a horizontal mold in the support, and a movable block having opposite working faces arranged to be alternately moved into position adjacent to the spreader tool and adjacent to the mold.

5. A clay working machine including a rotating spreader tool, a mold and a pivoted block having opposite working faces arranged to be alternately moved into position adjacent to the spreader tool and adjacent to the mold.

6. A clay working machine including a vertical rotating spreader tool, a horizontal mold and a pivoted block having opposite working faces arranged to be alternately moved into position adjacent to the spreader tool and adjacent to the mold.

7. A clay working machine including a rotating spreader tool, a mold, a pivoted frame, and a block swivelled upon the frame and having opposite working faces arranged to be alternately moved into position adjacent to the spreader tool and to the mold.

8. A clay working machine including a vertical rotating spreader tool, a horizontal mold, a pivoted frame, and a block swivelled upon the frame and having opposite working faces arranged to be alternately moved into position adjacent to the spreader tool and to the mold.

9. In a clay working machine, a block having a flexible surface, means for forming a flat clay disc upon said flexible surface of the block, a mold, and means for moving the block toward the mold for pressing the clay disc upon the mold.

10. In a clay working machine, a block having a flexible surface, a flannel drum head covering said surface, means for forming a flat clay disc upon said drum head, a mold, and means for moving the block toward the mold for pressing the clay disc upon the mold.

11. In a clay working machine, a flexible block, means for forming a flat clay disc upon said block, a mold, and means for moving the block toward the mold for pressing the clay disc upon the mold.

12. In a clay working machine, a flexible block, a flannel drum head upon the block, means for forming a flat clay disc upon said drum head, a mold and means for moving the block toward the mold for pressing the clay disc upon the mold.

13. In a clay working machine, a block having opposite flat surfaces and a central opening therethrough, a layer of flexible material upon each flat surface and spring means located in said opening and contacting both layers of flexible material, means for forming a flat clay disc upon either layer of flexible material, a mold, and means for moving the block toward the mold for pressing the clay disc upon the mold.

14. In a clay working machine, a block having opposite flat surfaces and a central opening therethrough, a layer of flexible material upon each flat surface and spring means located in said opening and contacting both layers of flexible material and a flannel drum head upon each resilient layer, means for forming a flat clay disc upon either layer of flexible material, a mold, and means for moving the block toward the mold for pressing the clay disc upon the mold.

15. In a clay working machine, a rubber block having a flat surface and a flannel covering upon the flat surface of the block, means for forming a flat clay disc upon said flannel covering, a mold, and means for moving the block toward the mold for pressing the clay disc upon the mold.

FRANK M. KINNARD.

REFERENCES CITED

The following references are of record in the file of this patent:

UNITED STATES PATENTS

| Number | Name | Date |
| --- | --- | --- |
| 2,167,386 | Kinnard | July 25, 1939 |
| 2,366,297 | Turner | Jan. 2, 1945 |